Feb. 14, 1967 C. J. HEITZMAN 3,303,545
MOLDING MACHINE WITH MOVABLE END MEANS FOR CLOSING MOLD
AND STRIPPING ARTICLE
Original Filed Dec. 30, 1963 4 Sheets-Sheet 1
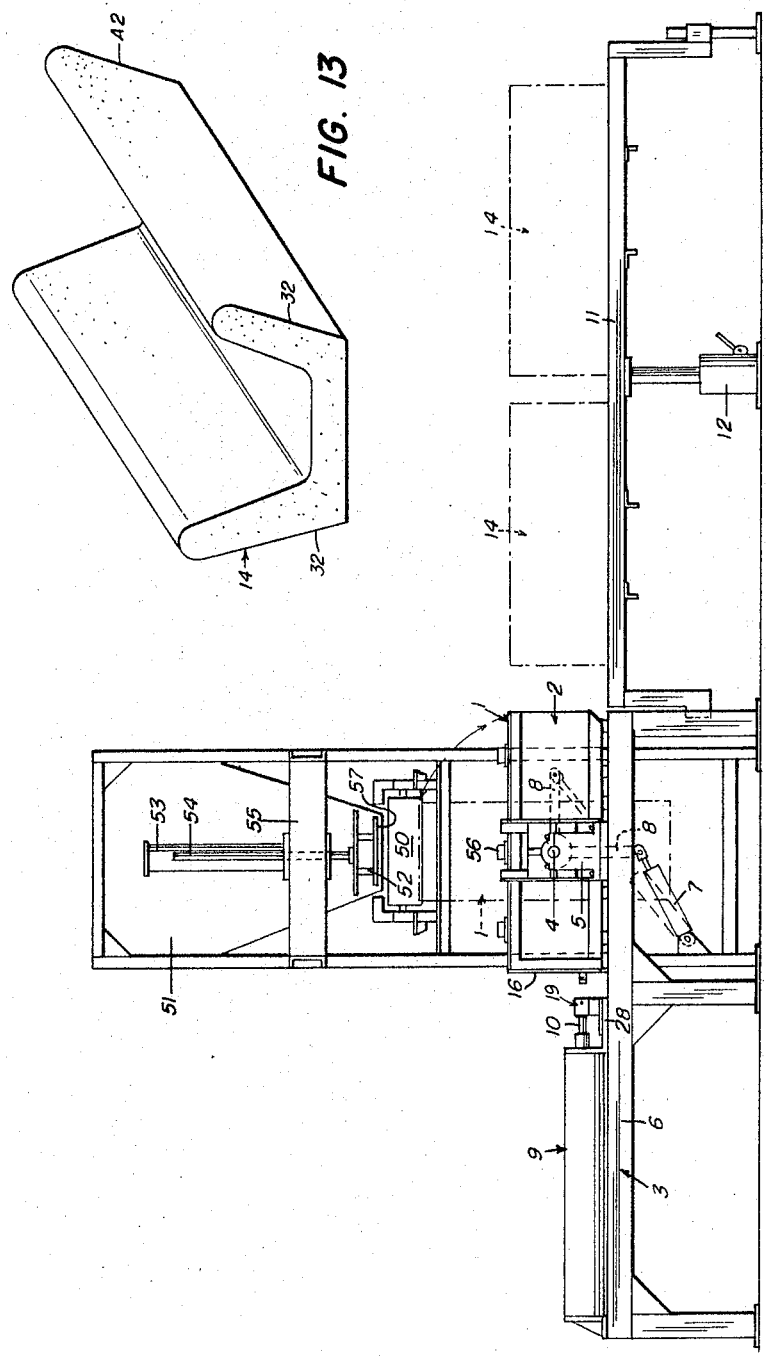
INVENTOR
CHARLES J. HEITZMAN
BY Wilmer Mechlin
his ATTORNEY

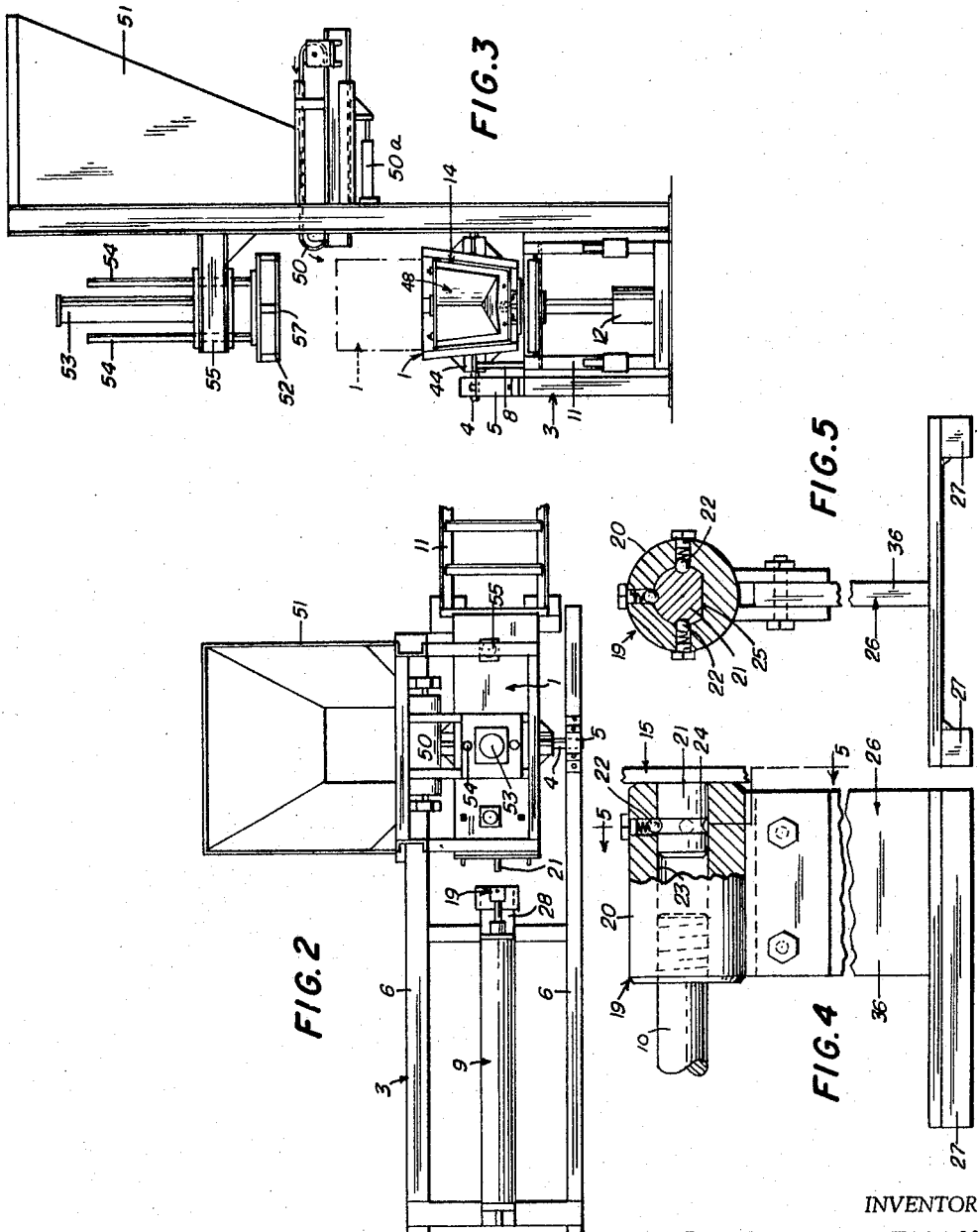

Feb. 14, 1967 C. J. HEITZMAN 3,303,545
MOLDING MACHINE WITH MOVABLE END MEANS FOR CLOSING MOLD
AND STRIPPING ARTICLE
Original Filed Dec. 30, 1963 4 Sheets-Sheet 3

INVENTOR
CHARLES J. HEITZMAN
BY Wilmer Mechlin
his ATTORNEY

Feb. 14, 1967          C. J. HEITZMAN          3,303,545
MOLDING MACHINE WITH MOVABLE END MEANS FOR CLOSING MOLD
AND STRIPPING ARTICLE
Original Filed Dec. 30, 1963                4 Sheets-Sheet 4
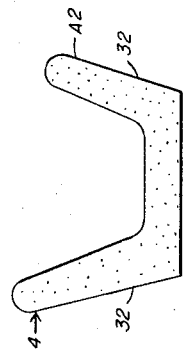
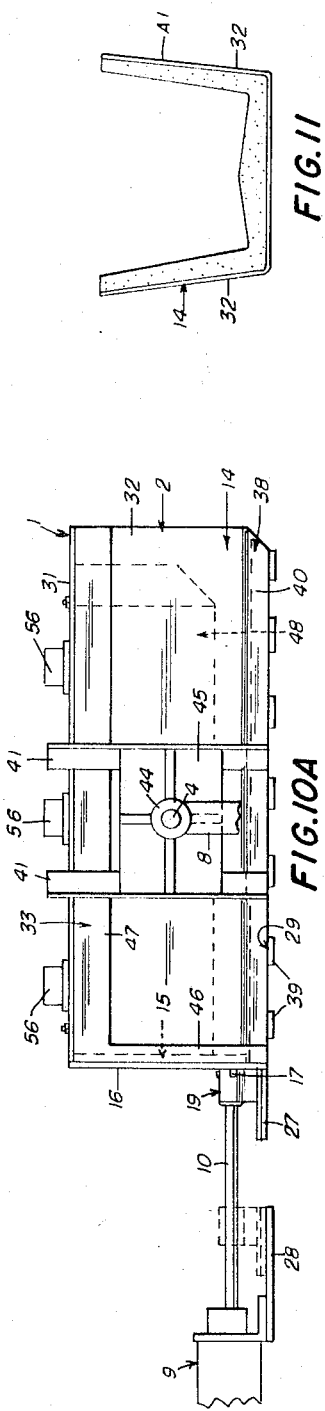
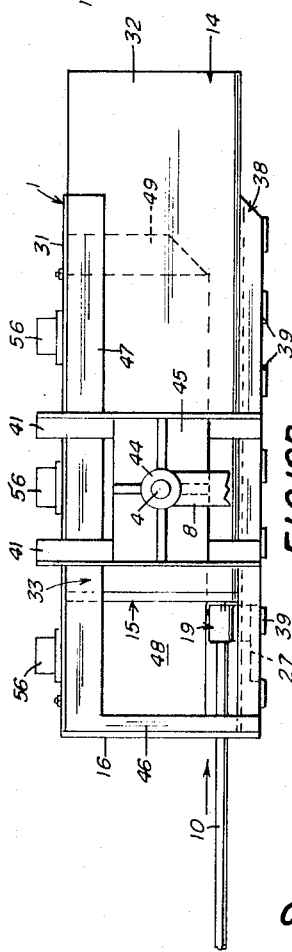
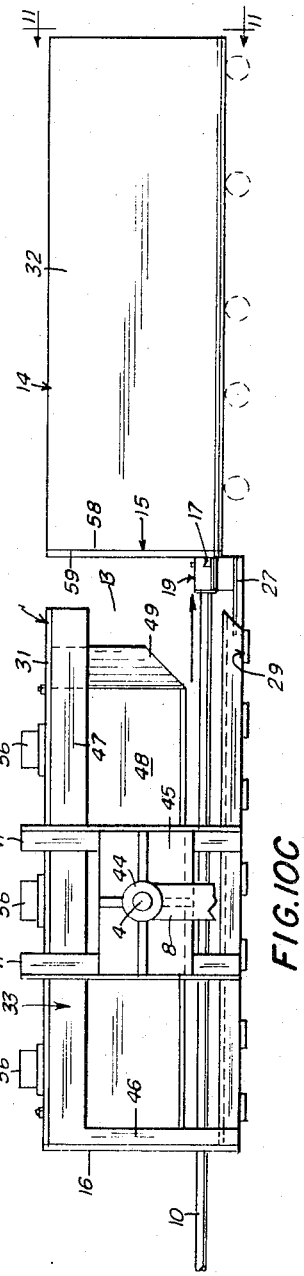
INVENTOR
CHARLES J. HEITZMAN
*Wilmer Mechlin*
*his* ATTORNEY

United States Patent Office 3,303,545
Patented Feb. 14, 1967

3,303,545
MOLDING MACHINE WITH MOVABLE END MEANS FOR CLOSING MOLD AND STRIPPING ARTICLE
Charles J. Heitzman, Honolulu, Hawaii, assignor to R & H Molding, Inc., Honolulu, Hawaii, a corporation of Hawaii
Continuation of application Ser. No. 334,133, Dec. 30, 1963. This application Jan. 6, 1966, Ser. No. 519,155
9 Claims. (Cl. 25—41)

This invention relates to machines for molding articles of concrete and other self-hardening material and is a continuation of my co-pending application Serial No. 334,133, now abandoned, filed December 30, 1963.

An object of the invention is to provide an improved machine for molding articles of self-hardening material which is adapted to produce articles of a particular shape uniformly and with a minimum of manual handling and is readily convertible to produce articles of other shapes.

Another object of the invention is to provide a machine for molding articles of self-hardening material wherein an article is molded in a mold open at one end and swingable on a fixed axis between vertical filling and horizontal stripping positions and in vertical position the material filling the mold is both tamped and vibrated, thereby ensuring the production of articles of uniformly high quality.

An additional object of the invention is to provide a molding machine of the above-described character wherein the mold is prepared for molding in its horizontal position and the subsequent steps in the molding operation are all performable mechanically under remote control.

A further object of the invention is to provide a machine for molding articles of self-hardening material wherein articles are molded in a mold box which is mounted on a fixed pivot for swinging between horizontal preparing and stripping and vertical filling positions and each article is molded against a liner which is stripped with it from the mold box at the end of a molding operation.

Another object of the invention is to provide a machine for molding articles of self-hardening material wherein articles are molded in a mold contained in a pivotally mounted mold box and either the mold box or for a similar article the parts responsible for the shape of the article, can readily be removed for adapting the machine to mold articles of various shapes.

A further object of the invention is to provide a machine for molding articles of self-hardening material wherein a discharge conveyor onto which molded articles are stripped forms a permanent part of the machine and is readily adapted to handle articles of various sizes and shapes.

Another object of the invention is to provide in a machine for molding articles of self-hardening material, a mold which during a molding operation is closed at its inner end by a push plate by which molded articles are stripped from the mold box at the end of the molding operation.

Another object of the invention is to provide a machine for molding articles of self-hardening material wherein a push plate which alternately closes an end of a mold contained in a mold box and strips molded articles from the box and a push rod responsible for moving the push plate relative to the box are connectable by connecting means of such construction and arrangement as automatically to connect and disconnect the push plate and push rod and enable the push plate to be pushed entirely through the box in stripping an article therefrom, while maintaining the push plate in alignment with the box so that the push plate without manual handling will be returned to end-closing position in the box on the retract stroke of the push rod.

An additional object of the invention is to provide a molding machine of the character just described in which the free end of the push rod at rest and during its advance and retract strokes and the push plate in its advanced position are both supported by the connecting means.

Other objects and advantages of the invention will appear hereinafter in the detailed description, be particularly pointed out in the appended claims and be illustrated in the accompanying drawings, in which:

FIGURE 1 is a side elevational view of a preferred embodiment of the molding machine of the present invention;

FIGURE 2 is a fragmentary plan view of the machine of FIGURE 1;

FIGURE 3 is an elevational view of the discharge end of the machine of FIGURE 1;

FIGURE 4 is a fragmentary side elevational view on an enlarged scale of the automatic connection between the push rod and push plate of the machine, with portions broken away and shown in section to more clearly illustrate certain of the details of construction;

FIGURE 5 is a vertical sectional view taken along lines 5—5 of FIGURE 4;

Figure 6:
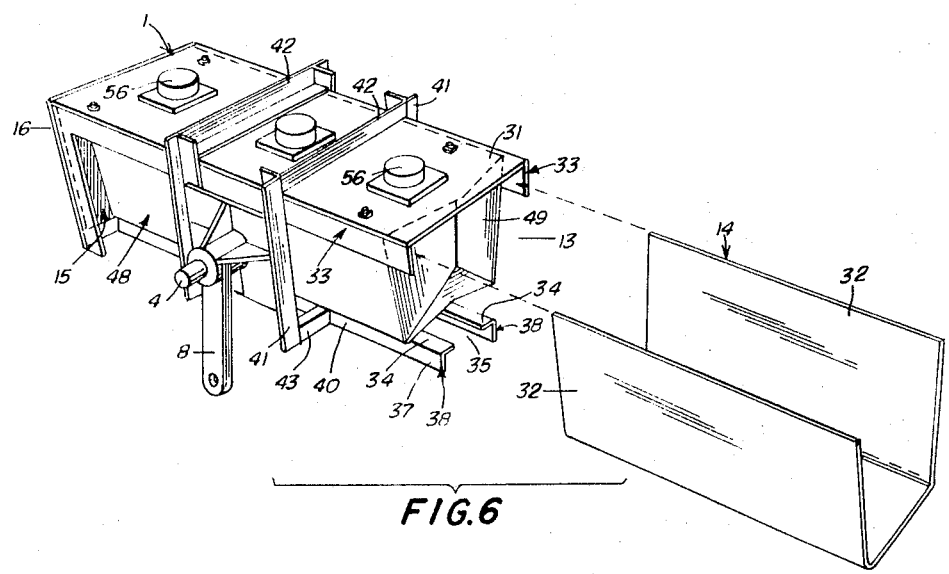
FIGURE 6 is an isometric view, on an intermediate scale, of an exemplary mold showing the liner stripped therefrom.
Figure 7:
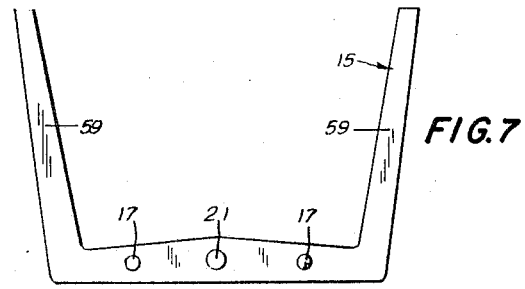
FIGURE 7 is a rear elevational view on an enlarged scale of the push plate of the mold of FIGURE 6.
Figure 8:
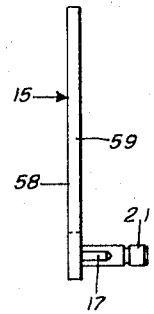
FIGURE 8 is a side elevational view of the push plate.
Figure 9:
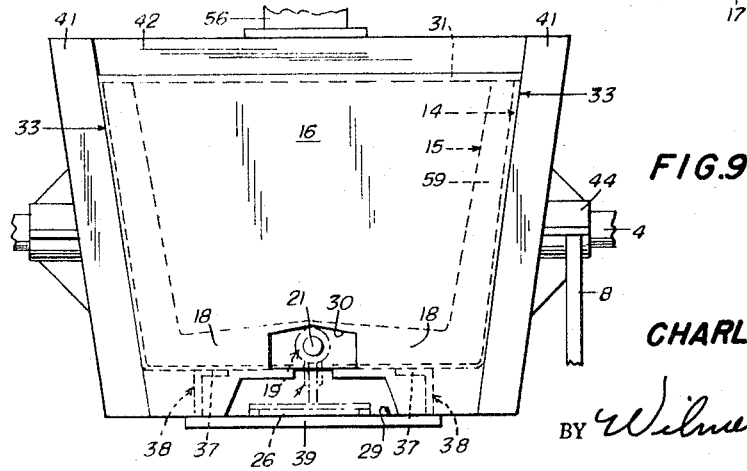
FIGURE 9 is a rear end elevational view on the scale of FIGURE 7 of the mold box of FIGURE 6 with the push plate and liner in filling position and indicating in dot-and-dash line the position of the cooperating coupler on the push rod during stripping.

FIGURES 10A, B and C are fragmentary side elevational views on the scale of FIGURE 6 showing successive steps in the stripping of a molded article from the mold box;

FIGURE 11 is a fragmentary end elevational view taken along lines 11—11 of FIGURE 10C showing a molded article after stripping and contained in its liner.

FIGURE 12 is a view corresponding to FIGURE 11 of a different article contained in its liner and molded by replacing the mold of the preceding figures by an interchangeable mold; and FIGURE 13 is an isometric view of the different molded article.

Referring now in detail to the drawings to which like reference characters designate like parts, the improved molding machine of the present invention is designed to mold articles of concrete or other self-hardening material in a mold box 1 which is swingable or pivotable on a fixed horizontal axis between a horizontal preparing and stripping position and a vertical filling position, to fill a mold 2 in the mold box when the latter is in its vertical position and, after tamping and vibrating the material in the mold, to return the mold box to horizontal position and strip the molded article from it. Except for preparing the mold 2, the preferred machine is capable of performing the various steps or operations in the overall molding operation mechanically, either automatically or under the control of an operator and is readily adapted to mold articles of various or different sizes and shapes.

Possessing the above capabilities, the preferred molding machine has a mold box 1 removably mounted on a stand or supporting frame 3, for swinging or pivoting above a fixed horizontal axis through some 90° between horizontal preparing and stripping position and vertical filling position, by trunnions 4 outstanding laterally from the sides of the box intermediate its ends and journalled in split bearings 5 mounted adjacent the box's side on a horizontal platform 6 on the stand. To enable the machine to operate properly, the mold box 1 must not only be swingable between its horizontal and vertical positions but also must be holdable, stoppable or lockable in each position during the part of the operation there performed. While these effects are producible by any suitable means and the means for swinging the box and for holding it in its two positions can even be separate, it is preferred to swing the mold box by a fluid-actuated piston 7 pivoted at one end to the stand 3 and at the other end to a crank arm 8 fixed to one of the trunnions 4 and to depend on setting or adjustment of the limits of movement of the piston to hold the mold box in each of its positions.

The platform 6 pivotably mounting the mold box 1 also mounts, rearwardly of the box, a horizontally acting pusher 9 for stripping, discharging or ejecting molded articles from the box in the latter's horizontal position as the last step in molding operation. Suitably a fluid-actuated pusher or stripping piston the pusher 9 has a push or piston rod 10 which normally or in retracted position is spaced rearwardly from the mold box and has a stroke sufficient to enable it to pass through and project forwardly beyond the box in stripped molded articles therefrom. The molded articles stripped from the mold box 1 are deposited on a suitable support 11 positioned at the discharge end of the stand 3. Rather than a separate dolly, the support 11 preferably is a roller or like conveyor connected to the stand and shiftable vertically relative thereto, as by a fluid-actuated jack 12, for positioning it to receive articles of different vertical dimensions.

Open at its front or discharge end 13, the mold box 1 may otherwise be closed and internally patterned to mold an article to the desired shape, so long as its internal configuration is such that a molded article can be stripped from the mold box immediately on its return from vertical to horizontal position. To the latter end, the mold box 1 is fittable with a removable liner, pallet or pan 14 which is adapted to be stripped from the box with a molded article and thereafter supports the article until it has hardened sufficiently to be self-sustaining. The liner 14 is insertable into the box 1 through its open front end and when seated therein is adapted to line the box at the bottom. If the sides of the article are of such shape that they cannot readily be formed by the sides of the mold box itself or should be supported during hardening after stripping, the liner 14 may line both the bottom and the sides of the mold box. Thus, for molding a flume section for which the exemplary mold box 1 and mold 2 are particularly designed, the liner 14, instead of being a flat bottom plate, may be of generally U-shape and upwardly flared at the sides to impart the desired configuration to the confronting sides or faces of the articles. In such case, the liner 14 contains the self-hardening material at those sides during filling, and on being stripped from the box with the molded article and left on the article until the latter has hardened sufficiently to be self-sustaining, supports the article during that time and ensures the machine a maximum output without detriment to the quality and uniformity of the molded articles produced in a given run.

The intended stripping of a liner 14 with each molded article is achieved by providing the mold box 1 with a push or end plate 15, which, during molding, is contained in the box against the latter's rear or back wall 16 and closes the back of the mold 2 and at that time preferably is positioned transversely of the box by a pair or plurality of transversely or laterally spaced positioning or locating pins 17 fixed toward opposite sides to either the plate or the rear wall and receivable in correspondingly located apertures 18 in the other of these members. On return of the mold box 1 to horizontal position, the push plate 15 is adapted to be connected to the push rod 10 of the stripping piston 9 and slid forwardly through the box under the force applied by the piston, in process pushing against the confronting ends of the molded article and the liner and stripping them together from the box onto the discharge conveyor 11.

Rather than simply have the push rod 10 engage the push plate 15 in its advance stroke, it is preferred that there be a positive connection between these members so as to enable the push rod not only to push the plate forwardly as it advances in stripping a molded article and its liner 14 from the mold box 1, but also to pull the push plate rearwardly back to starting position as it retracts. It is further preferred that both the connection and disconnection of the rod 10 and the push plate 15 be automatic so that the molding operation can be conducted by remote control. Fulfilling these requirements, the illustrated coupling or connection 19 is formed by a pair of mating or interfitting couplers or connectors, one attached to and projecting forwardly from the end of the push rod 10 and the other attached to and projecting rearwardly from the push plate. In the illustrated embodiment, the coupler on the push rod is a socketed head or female coupler 20 and that on the push plate 15 a connecting pin 21 or male coupler receivable in the head and lockable therein against release up to a predetermined limit of tension by one or preferably a plurality of radially acting spring-pressed balls 22 spaced about the socket 23 in the head and seatable in an annular groove 24 in the pin. With the tensile limit of the coupling 19 sufficient to withstand the friction engendered between the push plate 15 and the mold box 1 as a push plate slides rearwardly in the box, but not the engagement of the push plate with the rear wall 16 of the box, the couplers 20 and 21 will automatically disengage as the push plate reaches its initial position against the rear wall.

In the preferred coupling 19, the socket 23 and pin 21 are made correspondingly out-of-round, as by a flat 25 on each, to prevent relative rotation of the head 20 and push plate 15 and the head is attached to and surmounts a slide or support member 26 having laterally spaced skids 27. In the retracted position of the rod 10, the slide 26 rests on a ledge 28 on the platform 6 for supporting its end of the rod at proper height and, as the rod advances, slides on a guide or support surface 29 in the mold box 1 which is spaced below the push plate 15. The skids 27 have a sufficient span for lateral stability and are extended rearwardly of the head 20 such that they will still be in contact with and supported by the guide surface 29 at the end of the advance stroke of the push rod 10 when the push plate 15 and the head have been projected beyond the front end 13 of the mold box 1. With this construction, the slide 26 not only relieves the push plate 15 of the weight of the push rod 10, but, in cooperation with the positive, non-rotative connection 19 between the push plate and the head 20, supports the plate in its advanced position in alignment with the box, thus ensuring against interference with the plate's subsequent retraction.

Closed at the back or rear by the rear wall 16 except for an opening 30 in the latter for passing the head 20 and its slide 26, the mold box 1 is closed at the top by a top wall or cover plate 31 and either partly or fully closed at the sides depending on the form of the liner 14. In the exemplary form in which the sides 32 of the liner 14 serve as the sides of the mold 2, the sides 33 of the mold box 1 need not be closed and its bottom wall 34 in accordance with the preferred construction must be interrupted by a central longitudinal slot 35 to pass the upstanding flange 36 on the slide 26 to which the head 20 is bolted or otherwise releasably connected. It, therefore, is feasible to make the exemplary mold box of somewhat skeletal construction. In keeping, the illustrated box has its bottom wall 34 formed by the upper, inturned legs 37 of a pair of bottom angle irons 38 coextensive in length with the box and spaced laterally to provide between their inturned legs, the tongue-receiving slot 35. The guide surface 29, below the bottom wall 34 on which the skids 27 slide, may be continuous but, since the skids are of substantial length, it suffices to form the surface by a plurality of cross-plates 39 fixed as by welding to and connecting the lower, downstanding legs 40 of the angle irons 38 at intervals throughout their length, the longitudinal spacing between which is bridgeable by the skids.

For mounting the trunnions 4, the mold box 1 has at each side a pair of upstanding or upright longitudinally spaced side angle irons 41 positioned intermediate or between the ends of the box and connected and braced laterally at their upper ends by cross-irons 42, to the undersides of which the top plate 31 is fixed. The side irons 41 are connected at their lower ends to the adjoining bottom irons 38 by stub cross-pieces or irons 43 and the actual mountings for the trunnions 4 are a pair of rib-reinforced bosses 44 fixed to and outstanding from side plates 45 each of which in turn is fixed to and connects the side irons 41 of the adjoining pair. The mold box 1 is completed by side walls forming its sides 33. In the exemplary form in which the sides of the mold box need not be fully closed, the side walls 33 may be L-shaped side flanges 46 marginally engaging and fixed to the top and rear walls, 31 and 16, adjacent the latter's sides. These side flanges 46 not only strengthen the structure but their upper legs 47, which underlie the top wall 31 and are backed by the side irons 41, by extending substantially the length of the box 1, serve to position the liner 14 laterally relative to the box both while sliding longitudinally therein and when fully seated.

The form of the mold 2 contained in the mold box 1 during a given run will depend on the size and shape of the articles being molded. In any case the mold 2 will be open at the front and in the case of a solid block the mold may be closed at the bottom only by the liner 14, at the back by the push plate 15 and at the top and sides by the top wall 31 and solid side walls 33 of the mold box. For a more complicated article which is configured both externally and internally, the liner 14 may be of the illustrated U- or other suitable shape and may also include an inner part or liner 48 which, with the liner 14 as the outer part and any portion of the top wall 31 exposed to the self-hardening material, will determine the peripheral contour or configuration of the article.

Exemplary of molds suitable for such relatively complicated articles and itself suited to mold flume sections $A_1$ the illustrated mold 2 has such an inner part 48 the front end 49 of which is closed and sloped rearwardly towards the sides and bottom to deflect or direct the self-hardening material into the space between it and the outer liner 14. The inner mold part 48 is conveniently suspended from the top wall 31 of the mold box 1 and may be slidably attached to the wall so as to be stripped from the box with the molded article and outer mold part or liner 14. Alternatively, as in the illustrated embodiment, the inner part 48 may be bolted or otherwise removably secured or attached to the top wall 31 so as to remain stationary in the box during an entire run, in which case the push plate 15 will be internally configured to embrace and slide along the inner part as it strips the molded article and the outer part from the mold box. With the liner or liners 14 and 48 and the push plate 15, which, with any internally exposed surfaces of the mold box, form the mold 2, removable and interchangeable with corresponding parts of different molds, the mold box 1 is thus adapted for use in molding molded articles of similar sizes and shapes. Thus, for example, by replacing the liners 14 and 48 and push plate 15 by corresponding parts of an interchangeable mold, the molding machine can mold the dairy feeding trough section $A_2$ shown in FIGURES 12 and 13 in place of the flume section $A_1$ shown in section in FIGURE 11. Alternatively, the removable mounting of the mold box enables it to be interchanged as a whole with other mold boxes for adapting the machine to mold articles of a wide variety of sizes and shapes.

At the end of a given molding operation, the mold box 1 is prepared for the next operation by inserting a liner or liners 14 and 48 removed from a previously molded article after the latter has hardened sufficiently to be self-sustaining. The mold box 1 is next swung to the vertical position shown in dot-and-dash line in FIGURE 1 by actuation of its piston 7 and there has the contained mold 2 filled with self-hardening material through its then upper front end 13. To enable the filling of the mold 2 to be conducted automatically, there is provided in the preferred machine a feed conveyor 50 of endless belt or other suitable type, to which the self-hardening material used in the particular run is fed from a storage bin or hopper 51 and the discharge end of which is positioned above the upper end of the mold so as to discharge the material therein. To ensure that it will discharge at the correct point into any of the wide variety of molds with which the machine can be fitted, the discharge conveyor is preferably mounted for longitudinal adjustment by suitable means, such as the illustrated fluid-actuated piston 50a. Once the material has been fed into the mold 2 to the desired level, a vertically acting tamper 52 positioned above the mold and preferably the feed conveyor 50, as well, is driven or projected down into the mold, conveniently by an air-actuated piston 53, to tamp the material. Mounted for interchange with other tampers as necessary to suit the mold 2 used in a given run the tamper 52 preferably is held in vertical alignment with the mold in the vertical position of the mold box 1 by one or more guide rods 54 fixed at their lower ends to the tamper and slideable vertically in its mounting bracket 55. The tamping action of the tamper 52 will usually be assisted in consolidating the material in the mold by vibrating the mold during filling and tamping by air-actuated or other suitable vibrators 56, which, as illustrated, may readily be mounted on the top wall 31 of the mold box. Depending on the end configuration desired in the article being molded, the end or mold confronting face 57 of the tamper 52 and the corresponding outer face 58 of the push plate 15 which determines the shape of the article's other end will be either flat or configured.

To facilitate access to the various parts of the machine and particularly to the mold box 1 for the ready insertion of liners or interchange of mold boxes or molds 2, the feed conveyor 50, feed bin 51 and tamper 52 all are preferably mounted back of the stand 3, conveniently on the same pair of uprights or stanchions 59 forming part of and upstanding from a side of the stand behind or back of the mold box 1. As the tamper 52 must be aligned vertically with the mold box in the latter's vertical position, its mounting bracket 55 projects from the uprights 59 toward the other or near side of the stand 3, as viewed in FIGURE 1, but, since only the discharge end of the feed conveyor 50 need overlie the mold box 1, both the main part of it and the feed bin 51 desirably project in the opposite direction away from the stand.

From the above detailed description it will be apparent that there has been provided an improved machine for molding articles of self-hardening material which is readily adapted for producing articles of different size and shapes and is capable of a high rate of output, without detriment to the quality of the articles it produces. It should be understood that the described and disclosed embodiment is merely exemplary of the invention and that all modifications are intended to be included that do not depart from the spirit of the invention or the scope of the appended claims.

Having described my invention, I claim:

1. A machine for molding articles of self-hardening material comprising a mold box open at one end, a mold in said box and including a liner, means for swinging said box on a fixed horizontal axis between a vertical position for presenting said mold for filling with said material through said open end and a horizontal position, movable means in said box for closing a lower end of said mold during filling thereof in said vertical position, means for consolidating said material in said mold in said vertical position, means in said box for locating and during filling backing said movable means, and horizontally acting means removed from said box throughout said swinging thereof and projectable thereinto in said horizontal position for moving said movable means along said box and thereby stripping therefrom through said open end said liner and a molded article thereon, said movable means being releasably connectable to said horizontally acting means for return thereby to starting position in said box on retraction thereof after said stripping.

2. A machine according to claim 1 wherein the movable means is a push plate, and the means for consolidating the material in the mold are vertically acting tamping means projectable into the open end of the box in the vertical position thereof.

3. A machine according to claim 1 wherein the movable means is a plate at an inner end of the liner, the push plate is the movable means for closing the lower end of the mold in the vertical position of the box and moved by the horizontally acting means in the horizontal position of the box for stripping the liner and a molded article therefrom, the horizontally acting means are pusher means, and the machine further comprises coupling means for releasably connecting said plate and pusher means and enabling retraction of said pusher means to return said plate to starting position in said box.

4. A machine according to claim 1 wherein the locating and backing means are permanently attached to the box for locating and in said box's vertical position backing the movable means, and wherein the horizontally acting means is projectable into the box through said locating and backing means.

5. A machine according to claim 1 wherein the mold is one of a plurality of interchangeable molds selectively insertable in the box for molding different articles, each mold fitting in the box during molding of a particular article and including a liner.

6. A machine according to claim 1 wherein the mold box and mold are removable and selectively replaceable by interchangeable boxes and molds for molding different articles.

7. A machine according to claim 6 including feed conveyor means for feeding the material to a presented mold in the vertical position thereof, vertically acting tamping means projectable into the presented mold in said vertical position for consolidating the material therein, and discharge conveyor means for receiving each liner and the molded article thereon on stripping thereof from the box, said feed and discharge conveyor means being adjustable and said tamping means removable and selectively replaceable by interchangeable tamping means for adapting the feed discharge and tamping to any of the interchangeable boxes and molds.

8. A machine according to claim 3 wherein the liner is open-ended, the pusher means is a push rod, the coupling means are coupler means on said push rod and plate and automatically and non-rotatively coupling on projection of said rod, and the machine further comprises slide means connected to one of said coupler means and slideably engageable with means in said box, said slide means cooperating with said coupler means for supporting said plate in alignment with said box on pushing thereof through said open end and enabling said rod to pull said plate back to starting position in said box, and said coupler means automatically uncoupling on return of said plate to starting position for enabling said rod to return to retracted position beyond said box.

9. A machine according to claim 3 wherein the pusher means is a push rod, the coupling means include a coupler on an outer end of said rod and a coupler on said plate and releasably and non-rotatively coupling with said first-named coupler on projection of said rod, and the machine further comprises a guide surface in said box below said mold, and a slide connected to and depending from said first-named coupler and slideably engageable with said surface for supporting said end of said rod thereon, said slide cooperating with said couplers for supporting said plate in alignment with said open end of said box on pushing thereof therethrough and enabling retraction of said rod to return said plate to starting position in said box.

References Cited by the Examiner

UNITED STATES PATENTS

| | | | |
|---|---|---|---|
| 1,466,509 | 8/1923 | Laskey | 18—3.5 |
| 2,313,825 | 3/1943 | Kardos et al. | 25—41 |
| 2,534,421 | 12/1950 | Dieteit et al. | 25—41 |
| 2,663,063 | 12/1953 | Van Loon | 25—41 |
| 2,679,272 | 5/1954 | Giannone | 81—177 |
| 3,147,519 | 9/1964 | Hilliard | 18—2 |

J. SPENCER OVERHOLSER, *Primary Examiner.*

R. D. BALDWIN, *Assistant Examiner.*